(12) United States Patent
Wang et al.

(10) Patent No.: US 8,201,094 B2
(45) Date of Patent: Jun. 12, 2012

(54) METHOD AND APPARATUS FOR COLLABORATIVE GRAPHICAL CREATION

(75) Inventors: Hao Wang, Beijing (CN); Kun Yu, Beijing (CN); Liu Chang, Beijing (CN)

(73) Assignee: Nokia Corporation, Espoo (FI)

( * ) Notice: Subject to any disclaimer, the term of this patent is extended or adjusted under 35 U.S.C. 154(b) by 350 days.

(21) Appl. No.: 12/567,057

(22) Filed: Sep. 25, 2009

(65) Prior Publication Data

US 2011/0078590 A1    Mar. 31, 2011

(51) Int. Cl.
*G06F 3/00* (2006.01)
*G06F 3/048* (2006.01)
*G06F 15/16* (2006.01)

(52) U.S. Cl. ......... 715/751; 715/754; 715/759; 709/204

(58) Field of Classification Search .......... 715/751, 715/754, 759; 709/205, 207
See application file for complete search history.

(56) References Cited

U.S. PATENT DOCUMENTS

| | | | | |
|---|---|---|---|---|
| 5,107,443 | A * | 4/1992 | Smith et al. ............ | 715/751 |
| 5,337,407 | A | 8/1994 | Bates et al. | |
| 5,353,398 | A * | 10/1994 | Kitahara et al. ........ | 715/759 |
| 5,787,262 | A * | 7/1998 | Shakib et al. .......... | 709/205 |
| 5,890,177 | A * | 3/1999 | Moody et al. ........... | 715/210 |
| 6,049,334 | A | 4/2000 | Bates et al. | |
| 6,067,551 | A | 5/2000 | Brown et al. | |
| 6,073,161 | A * | 6/2000 | DeBoskey et al. ...... | 709/200 |
| 6,240,414 | B1 * | 5/2001 | Beizer et al. ........... | 1/1 |
| 6,938,070 | B2 | 8/2005 | Esposito | |
| 7,516,132 | B1 | 4/2009 | Fast et al. | |
| 7,593,943 | B2 * | 9/2009 | Clarke et al. ........... | 1/1 |
| 7,603,626 | B2 * | 10/2009 | Williams et al. ........ | 715/751 |
| 7,769,810 | B1 * | 8/2010 | Kaufman ................. | 709/205 |
| 7,949,990 | B2 * | 5/2011 | Pfeil et al. .............. | 716/139 |
| 7,958,453 | B1 * | 6/2011 | Taing .................... | 715/744 |
| 8,019,817 | B2 * | 9/2011 | Yoshida et al. .......... | 709/205 |
| 2004/0230662 | A1 * | 11/2004 | Estrada et al. .......... | 709/207 |
| 2005/0210392 | A1 * | 9/2005 | Koide et al. ............ | 715/751 |
| 2006/0059431 | A1 * | 3/2006 | Pahud .................... | 715/751 |
| 2006/0136441 | A1 * | 6/2006 | Fujisaki ................. | 707/101 |
| 2007/0186171 | A1 * | 8/2007 | Junuzovic et al. ....... | 715/751 |
| 2007/0204221 | A1 | 8/2007 | Kimmerly et al. | |
| 2008/0114844 | A1 * | 5/2008 | Sanchez et al. ......... | 709/206 |

(Continued)

FOREIGN PATENT DOCUMENTS

EP    1 451 732    9/2004

(Continued)

OTHER PUBLICATIONS

Xue et al., Conflict Control Locking in Distributed Cooperative Graphics Editors, Aug. 6, 2002.*

(Continued)

*Primary Examiner* — Tadeese Hailu
*Assistant Examiner* — Nicholas Ulrich
(74) *Attorney, Agent, or Firm* — Ditthavong Mori & Steiner, P.C.

(57) ABSTRACT

An approach is provided for performing collaborative graphical creation. It is determined that a plurality of modifications are made within a collaborative environment to an area of an image. The modifications are initiated by a plurality of members of a social network service. A conflict rule specified by the social network service is retrieved. One of the modifications is selected based on the conflict rule.

17 Claims, 12 Drawing Sheets

U.S. PATENT DOCUMENTS

| | | | |
|---|---|---|---|
| 2009/0077170 A1* | 3/2009 | Milburn et al. | 709/203 |
| 2009/0106322 A1* | 4/2009 | Chen | 707/201 |
| 2010/0257457 A1* | 10/2010 | De Goes | 715/751 |
| 2010/0318922 A1* | 12/2010 | Strathearn et al. | 715/751 |

FOREIGN PATENT DOCUMENTS

| | | |
|---|---|---|
| JP | 4-54558 | 2/1992 |
| JP | 5-165932 | 7/1993 |
| WO | WO 03/050726 A1 | 6/2003 |
| WO | WO 2007/062949 A1 | 6/2007 |

OTHER PUBLICATIONS

Bajaj, C., et al.: Object Based Constraint Management for Collaborative Systems. Published: Jun. 28, 1996, pp. 1-26, http://www.cs.purdue.edu/research/technical_reports/1996/TR%2096-039.pdf.

Chen, D., Sun, C.: Optional and Responsive Locking in Collaborative Graphics Editing Systems. Griffith University, pp. 1-18, http://hobbit.ict.griffith.edu.au/~scz/sigce/conferences/workshop99/David.ppt#256,1,Optional and responsive locking in collaborative graphics editing systems.

Lin, K., et al.: A Constraint Maintenance Strategy and Applications in Real-Time Collaborative Environments (Abstract). Published: Sep. 22, 2005, pp. 1-3, http://www.springerlink.com/content/dfyx6vn400kvxep7/.

Pinho, M., et al.: Cooperative Object Manipulation in Immersive Virtual Environments: Framework and Techniques (Abstract). pp. 1-16, http://portal.acm.org/citation.cfm?id=585769&dl=GUIDE&coll=GUIDE&CFID=66521433&CFTOKEN=37375111.

* cited by examiner

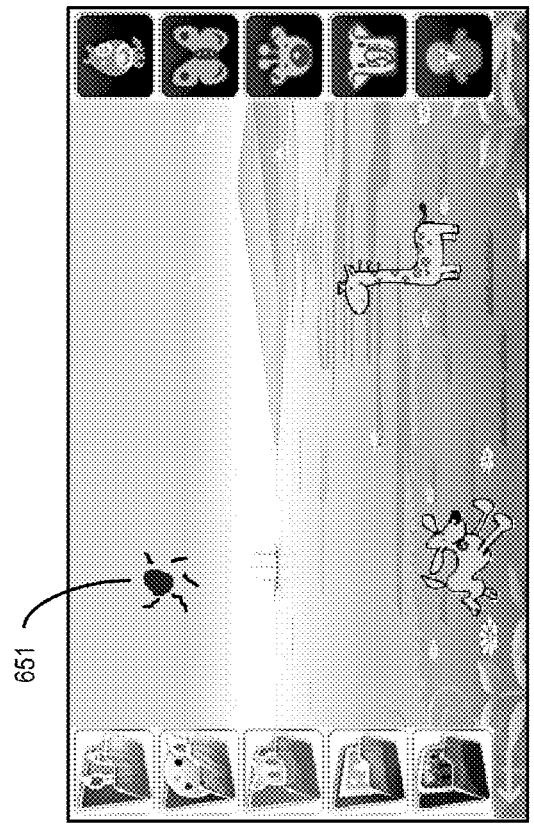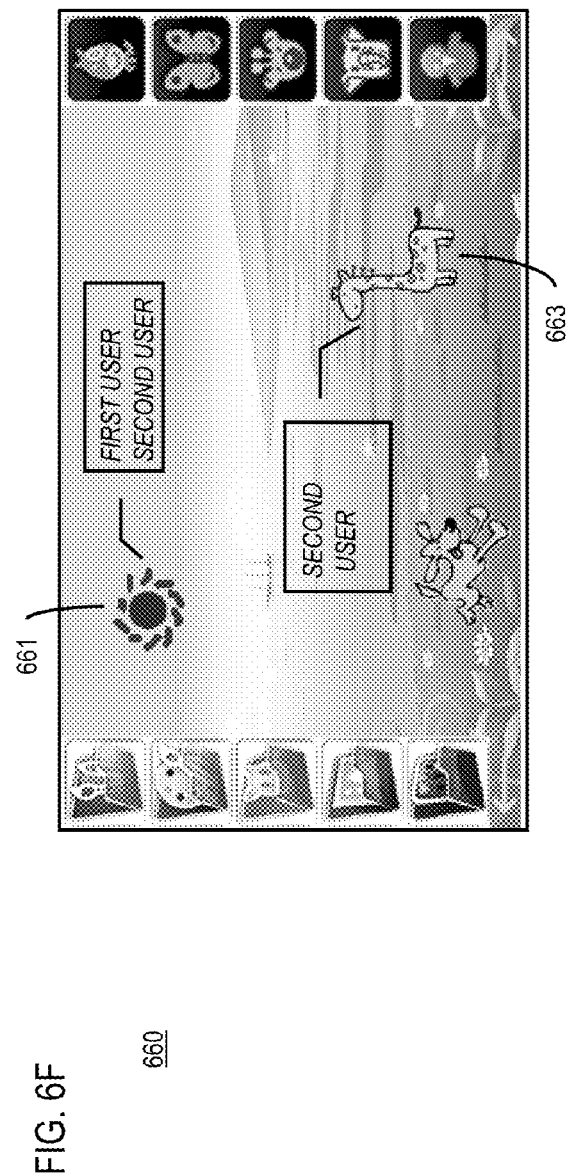
FIG. 6E
FIG. 6F

METHOD AND APPARATUS FOR COLLABORATIVE GRAPHICAL CREATION

BACKGROUND

Collaborative applications have recently become a focus area for service providers (e.g., wireless, cellular, etc.) and device manufacturers to deliver value and convenience to consumers. These applications have permitted users who are geographically dispersed to work on common tasks and projects. For example, whiteboarding applications support concurrently annotating and editing of documents, e.g., word processing or presentation materials. However, little attention has been paid to other types of applications, particularly highly graphics intensive applications, as these applications consume relatively large amount of resources—i.e., bandwidth and processor. Conventionally, interactive whiteboards, and the like, have utilized pixel-level replacements to manage modifications of areas by the multiple users. Unfortunately, this approach is not viable in graphics applications because the determination and resolution of conflicts (e.g., two users attempting to edit the same image) are difficult and impractical at the pixel-level.

SOME EXAMPLE EMBODIMENTS

According to one embodiment, a method comprises determining that a plurality of modifications are made within a collaborative environment to an area of an image, wherein the modifications are initiated by a plurality of members of a social network service. The method also comprises retrieving a conflict rule specified by the social network service. The method further comprises selecting one of the modifications based on the conflict rule.

According to another embodiment, an apparatus comprising at least one processor, and at least one memory including computer program code, the at least one memory and the computer program code configured to, with the at least one processor, cause, at least in part, the apparatus to determine that a plurality of modifications are made within a collaborative environment to an area of an image, wherein the modifications are initiated by a plurality of members of a social network service. The apparatus is also caused, at least in part, to retrieve a conflict rule specified by the social network service. The apparatus is further caused, at least in part, to select one of the modifications based on the conflict rule.

According to another embodiment, a computer-readable storage medium carrying one or more sequences of one or more instructions which, when executed by one or more processors, cause, at least in part, an apparatus to determine that a plurality of modifications are made within a collaborative environment to an area of an image, wherein the modifications are initiated by a plurality of members of a social network service. The apparatus is also caused, at least in part, to retrieve a conflict rule specified by the social network service. The apparatus is further caused, at least in part, to select one of the modifications based on the conflict rule.

According to another embodiment, an apparatus comprises means for determining that a plurality of modifications are made within a collaborative environment to an area of an image, wherein the modifications are initiated by a plurality of members of a social network service. The apparatus also comprises means for retrieving a conflict rule specified by the social network service. The apparatus further comprises means for selecting one of the modifications based on the conflict rule.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6B-6F are diagrams of user interfaces utilized in the process of FIG. 6A, according to various embodiments;

DESCRIPTION OF SOME EMBODIMENTS

Examples of a method, apparatus, and computer program for performing collaborative graphical creation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
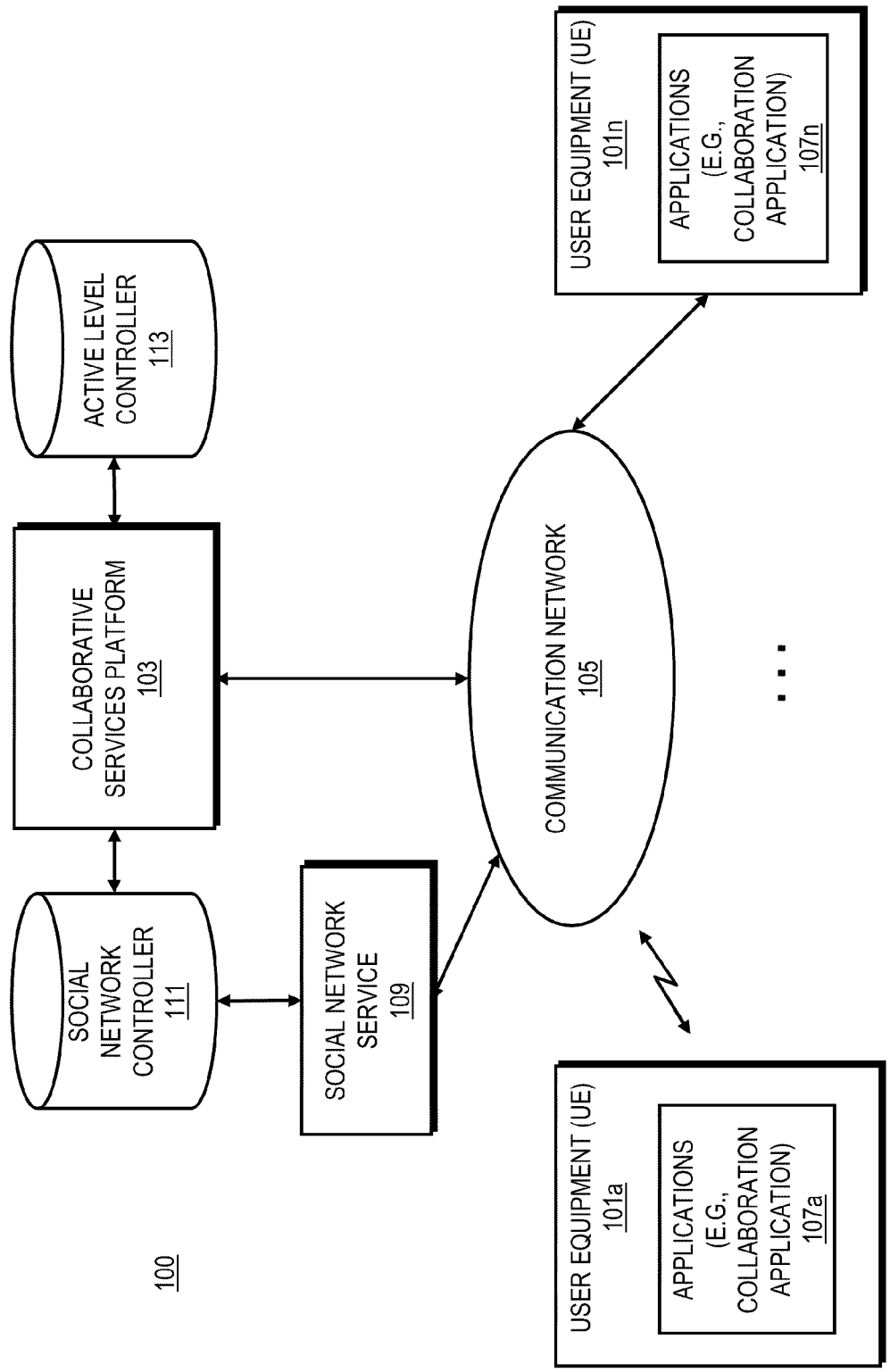
FIG. 1 is a diagram of a system capable of performing collaborative graphical creation, according to one embodiment.

FIG. 1 is a diagram of a system 100 capable of performing collaborative graphical creation, according to one embodiment. Graphics and animation composition and control can be accomplished using graphical objects and elements. The graphics and animation composition and control can be performed in a collaborative graphical environment, where users can view changes made by other users in real time or near real time. In a multi-user graphical environment, these graphical objects and elements can be manipulated to a possible level of confliction, that is, a level where the graphical objects and elements are being modified by multiple users in an inconsistent way. For example, a first user could create and manipulate an object. Then, second user can further manipulate the object. A selection needs to be made whether the first user manipulation or the second user manipulation should be selected for use in the graphical environment. Moreover, the first user and the second user may simultaneously determine that the users wish to manipulate a single object. This can lead to a real time conflict in collaboration. Thus, it is desired to have a scheme to resolve conflicts as the conflicts arise. Additionally, because it is desired to have multiple users contributing to the composition, it would be beneficial to determine the role of each user in contributing to the creation.

To address these problems, a system 100 of FIG. 1 introduces the capability to perform collaborative graphical creation. Users can use user equipment (UE) 101a-101n to communicate with a collaborative services platform 103 over a communication network 105. The collaborative services platform 103 can provide a collaborative graphical environment that the users can access via a collaboration application 107a-107n. Moreover, the UEs 101 and collaborative services platform 103 can be in communication with a social network service 109 that can provide organizational information about the users. This organizational information as well as social priority rules can be stored in a social network controller 111 associated with the collaborative services platform 103. Additionally, an active level controller 113 may be associated with the collaborative services platform 103 to monitor and control use of the collaborative graphical environment by the users. Further, the collaborative services platform 103 can associate contributions made by users with the collaborative graphical environment. These associations can be displayed during a presentation of the collaborative graphical environment.

According to one embodiment, the system 100 includes a collaborative services platform 103. The collaborative services platform 103 can be used to deploy and monitor a collaborative graphical environment that can be utilized by collaboration applications 107 of UEs 101. In some embodiments, the collaborative services platform 103 can be implemented on a UE 101. In other embodiments, the collaborative services platform 103 can reside upon a computer system such as a server. The collaborative services platform 103 may also be associated with a social network controller 111 and an active level controller 113. A user can access the collaborative graphical environment via a collaboration application 107 once the collaborative graphical environment is deployed. A collaboration application 107 can request for the deployment of the collaborative graphical environment. Deployment of the collaborative graphical environment can include providing one or more background images that can be utilized by users to sketch on, create objects and elements, and manipulate elements and objects. Thus, a user using a collaboration application 107 can draw sketches, select animated objects and drag them to a desired place on the background image, change the background, initiate scrolling of a background image, and other graphical actions.

The system 100 of FIG. 1 includes a social network service 109, according to one embodiment. The social network service 109 can include members who form social networks to communicate with colleagues, friends, and other contacts or people. Additionally, the social network service 109 can have organizational information associated with its members or other external social networks (e.g., FACEBOOK, MYSPACE, etc.) and relationships or interdependencies among the contacts. This organizational information can be accessed by a social network controller 111. Under some scenarios, the social network service 109 can be created for the purpose of using a collaborative environment. Moreover, the social network service 109 can specify a set of rules based at least in part on the organizational information. These rules can include conflict rules that can be used to determine how to resolve conflicts based on the organizational information.

Under one scenario, the collaborative services platform 103 provides a collaborative graphical environment for UEs 101. When the collaborative graphical environment is initiated, the collaborative services platform 103 can receive and/or associate identifiers (e.g., user name) of users that are associated with the collaborative graphical environment. The collaborative graphical environment can be stored in a memory (e.g., a volatile memory and/or a non-volatile memory) of the collaborative services platform 103. The collaborative services platform 103 can then assign operational priorities to the users based on the social role of each user based on the social network controller 111 and based on the activity level and activity history of each user based on information from the active level controller 113. Moreover, the operational priorities can be dynamic based on a rating received from the social role and the activity history of each user. In some embodiments, the social role of a user can change based on a portion of the collaborative graphical environment. For example a user can be a supervisor of one set of frames of an animation presentation and a normal worker for another set of frames of the animation presentation.

The collaborative graphical environment can provide a background image for users to use for an image or animation presentation. A user may desire to change the background image as a global change for all users and each animation sketch. The user can make the change on the user's collaboration application 107, which will request that the change be made to the collaborative graphical environment. The collaborative services platform 103 can then receive the request and create a second instance of the background image for use while determining if the request should be granted. The collaborative services platform 103 can then forward the change request information to other users associated with the collaborative graphical environment. The collaborative services platform 103 can request that the users provide feedback on whether the change should be approved.

In one embodiment, a weighted or un-weighted vote can be used to determine whether the change request should be approved. In an un-weighted vote, each user has a single vote. In a weighted vote, the magnitude of a user's vote can be determined on the social organizational level of the user and/or the activity level of the user. A user with a supervisory role can have a greater magnitude vote (e.g., 3 votes or 2.5 votes). Additionally, a user that has been more active in the collaboration process may have a greater magnitude vote even though the user is not in a supervisory role. If the vote meets a certain threshold count (e.g., a majority of available votes), the background image is approved and can be changed.

In another scenario, a first user adds an object to an area of the collaborative graphical environment and begins manipulation of the object. In this scenario, the area can be a set of coordinates of an image of the collaborative graphical environment. The area can be selected by the first user via a graphical user interface of the first user's UE 101. The first user can also perform the actions on a collaboration application 107 of the first user's UE 101. The collaboration application 107 can synchronize with the collaborative services platform 103 periodically to update the collaborative services platform 103 of the first user's actions. The collaborative services platform 103 can monitor the actions by the first user and determine that the actions are associated with the area. The collaborative services platform 103 can then associate the first user as currently working upon the area. The collaborative services platform 103 may also update each other collaboration application 107 associated with the collaborative graphical environment to notify other users that the first user is actively working upon the area. Because the area is being worked upon, the area can be locked from modification by other users. The actions accomplished by the first user in the area may also be viewable by other users of the collaborative graphical environment via synchronization. A second user on the second user's UE 101 may view the actions by the first user while the first user is performing actions in the area. The second user may not have access to change the area because the first user is currently active, however, the second user may add comments, such as emotional figures of encouragement, viewable to the first user. In this manner, the second user can add the second user's viewpoint to the actions of the first user without causing a conflict. Once the actions are completed by the first user, the actions can be approved by the collaborative services platform 103. The collaborative services platform 103 can then associate the changes to the object and/or area with the first user (e.g., as a creator and manipulator) and/or second user (e.g., as a commentator).

As shown in FIG. 1, the system 100 comprises a user equipment (UE) 101 having connectivity to collaborative services platform 103 and a social network service 109 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, the collaborative services platform 103, and the social network service 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
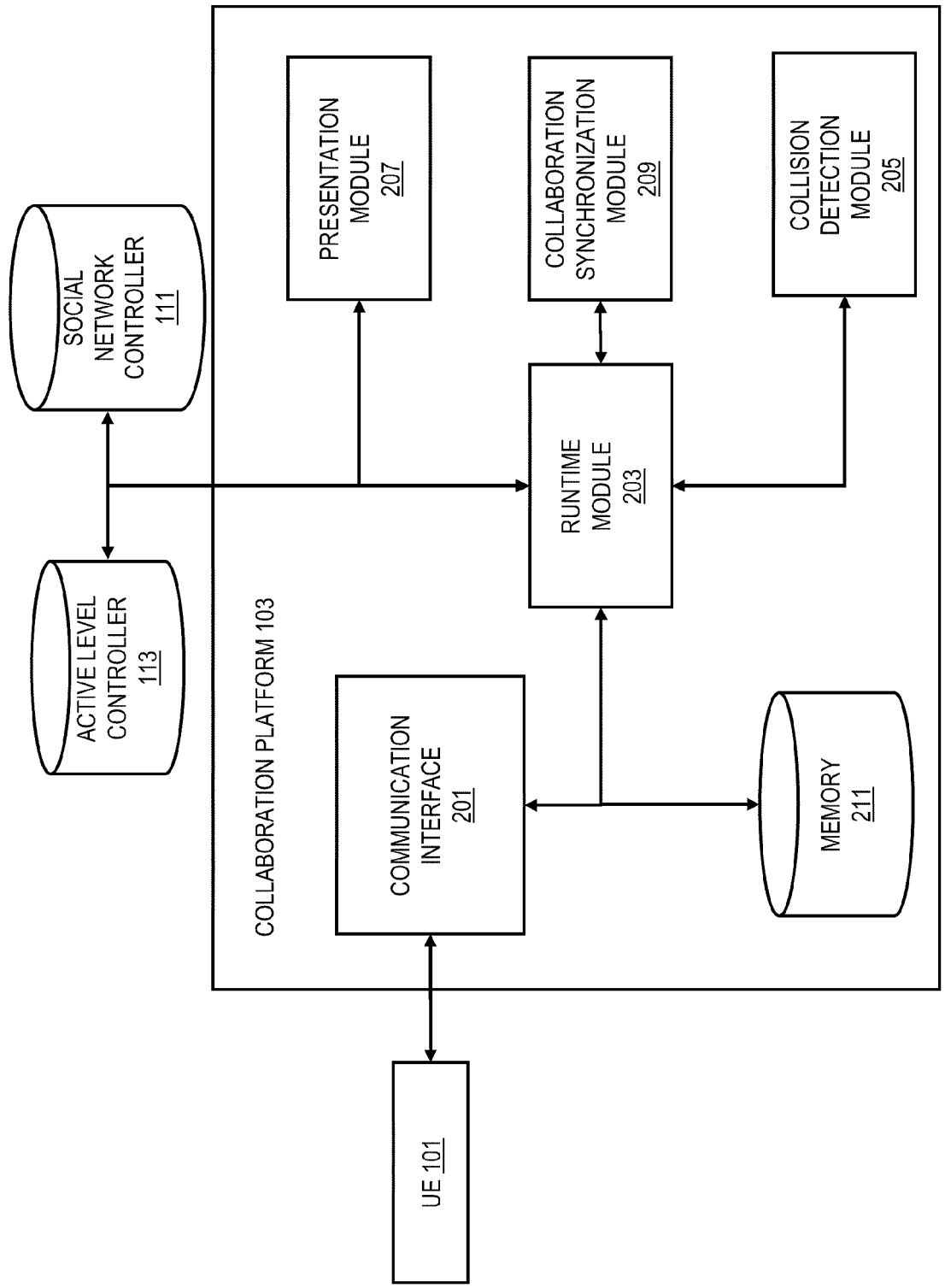
FIG. 2 is a diagram of the components of a collaborative services platform that can provide for collaborative graphical creation, according to one embodiment.

FIG. 2 is a diagram of the components of a collaborative services platform 103 that can provide for collaborative graphical creation, according to one embodiment, according to one embodiment. By way of example, the collaborative services platform 103 includes one or more components for providing collaborative graphical creation. It is contemplated that the functions of these components may be combined in one or more components or performed by other components of equivalent functionality. In this embodiment, the collaborative services platform 103 includes a communication interface 201, a runtime module 203, a collision detection module 205, a presentation module 207, a collaboration synchronization module 209, and a memory 211.

The collaborative services platform 103 includes a communication interface 201, according to one embodiment. The communication interface 201 can include communications hardware and software to communicate with UEs 101. Under one scenario, the UEs 101 and collaborative services platform 103 utilize a communication layer of a cross-layer collaborative protocol to communicate. The communication layer can include operational signals and parameters that are transmitted in a multicast mode. In the multicast mode, a runtime module 203 of the collaborative services platform 103 can send communications messages to groups (e.g., the users associated with the collaborative graphical environment) or subgroups (e.g., a group of users assigned a task to complete in the collaborative graphical environment) of users. Additionally, a user may have priority rights to broadcast to all users of the of the collaborative services platform 103 or to groups of multiple collaborative environments. The collaborative environments can be stored in a memory 211 associated with the collaborative services platform 103. The memory 211 may be volatile or non-volatile. The broadcast can occupy a predetermined channel purposed for such broadcasts. Moreover, when the broadcast is sent, the user with the priority rights can cause an immediate synchronization of the collaborative environment and update the UEs 101 of the broadcasts. The synchronization can include updating the collaborative environment in the memory 211 and sending messages of the update to UEs 101 of the users.

The collaborative services platform 103 also includes a collision detection module 205, according to one embodiment. The runtime module 203 may use the collision detection module 205 to identify collisions that occur in a collaborative environment that is stored in memory 211. Collisions can be identified based on a cooperation layer of the cross-layer collaborative protocol. A collision can be detected if it is detected that one or more user requests to work on a single area or a single object of the collaborative environment simultaneously. Before a UE 101 of a user can access an area or object of the collaborative environment, the UE 101 sends a request to the runtime module 203 for the access via the communication layer. If the area or object is available, the user can be provided access to the area or object and the area or object can be designated as being actively used by the user. This status can be stored and updated in the active level controller 113. The active status can be changed to inactive when the user accesses another area or object or if the user does not perform a function within a predetermined timeout period. If a subsequent user attempts to access the area or object when the user is active, the subsequent user may be denied access and provided an availability message when the area or object becomes available. Collisions may also be resolved by the runtime module 203 using the cooperation layer.

In one embodiment, the collaborative services platform 103 includes a presentation module 207. The runtime module 203 can utilize the presentation module 207 to provide views of a complete or incomplete collaborative environment. A representation layer of the cross-layer collaborative protocol can be used to render a personalized presentation of the collaborative environment based on contributions from one or more users. Contributions can be detected by the representation layer each time a user submits completed work or actions on an object or an area. The submission and corresponding information about the submission can be stored and updated in the social network controller 111. As used herein, according to some embodiments, "contributions" may be used to refer to any actions completed by a user that can be associated with an area or object. Examples of contributions include creating an object, moving an object, commenting on an object or an area, recommending an object or modifications to an area, modifying an object or area, etc. These contributions can be associated with a tag or a label that can be displayed for a personalized view of the collaborative environment presentation. For example, a user may select a personalized view to display the contributions of a first user during a rendered presentation of the collaboration work product. Moreover, the user may select to view the contributions of more than one user during the personalized presentation.

In another embodiment, the collaborative services platform 103 can include a collaboration synchronization module 209. The runtime module 203 may utilize the collaboration synchronization module 209 to coordinate manipulations via the cooperation layer of the collaborative protocol. Manipulations can include creation and/or modification of areas or objects of the collaborative environment. Moreover, manipulations can be synchronized when a user submits work product or on a periodic basis while the user is manipulating an object or area. In this manner, manipulations can be displayed to other users of the collaborative environments, via transmission over the communication layer, periodically so that the other users are made aware of the user's manipulations.

Figure 3:
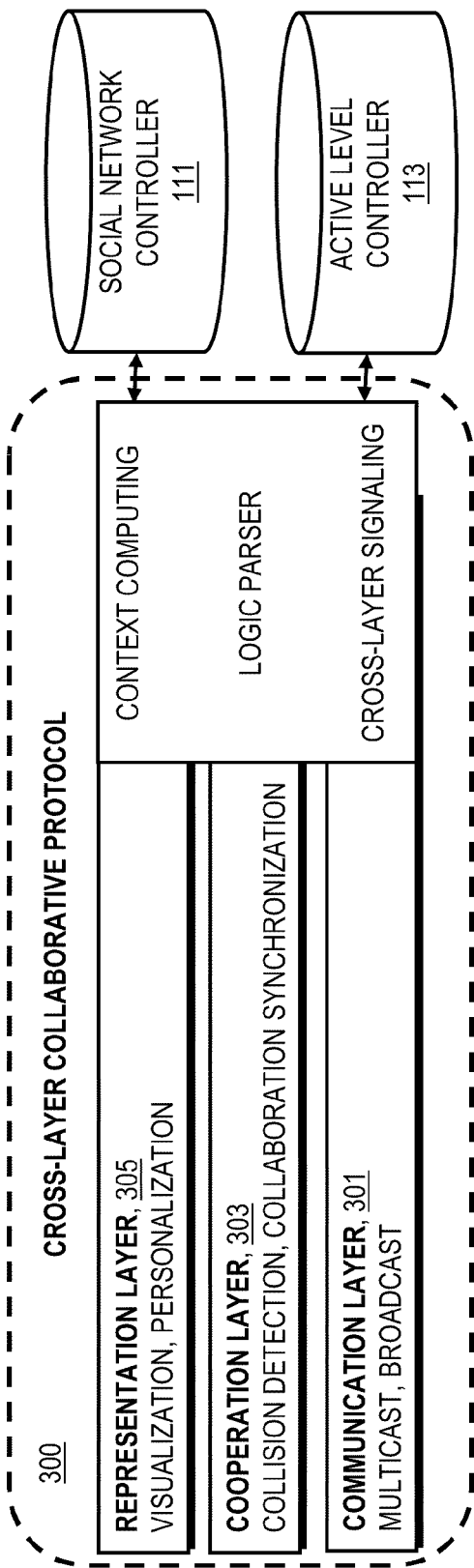
FIG. 3 is a diagram of a cross-layer collaborative protocol that may be used to provide collaborative graphical creation, according to one embodiment.

FIG. 3 is a diagram of a cross-layer collaborative protocol 300 that may be used to provide collaborative graphical creation, according to one embodiment. The cross-layer collaborative protocol 300 may include a communication layer 301, a cooperation layer 303, and a representation layer 305. The as previously discussed, the three layers can be used to interface between a UE 101 and a collaborative services platform 103 by storing and receiving information from a social network controller 111 and an active level controller 113.

In one embodiment, the cross-layer collaborative protocol 300 includes a communication layer 301. The communication layer 301 may be used to multicast or broadcast messages. A user on a UE 101 can utilize functions of a collaboration application 107. The collaboration application 107 can convert the functions via the cross-layer collaborative protocol 300 to a communication layer 301 messages. The communication layer 301 can transmit the messages to the collaborative services platform 103. The collaborative services platform 103 can monitor the messages and classify the messages into messages that are utilized by the collaborative services platform 103 to perform a function (e.g., update or modify the social network controller 111 or the active level controller 113), to multicast the message or to broadcast the message as previously discussed. Moreover, the communication layer 301 can be used to multicast and broadcast messages to UEs 101 based on synchronization and collision detection activities of the cooperation layer 303.

In one embodiment, the cross-layer collaborative protocol 300 includes a cooperation layer 303. The cooperation layer 303 includes collision detection and collaboration synchronization functionalities as discussed in the collision detection module 205 and the collaboration synchronization module 209. Additionally, the cooperation layer 303 can send messages via the communication layer 301 to modify the social network controller 111 and the active level controller 113. The social network controller 111 can be used to control the collaborative environment for social creation by storing information about the users, such as the role of the users in a social network service 109. For example, if a group of users was represented as a family, parents may have more priorities or rights than children. In another example, in a classroom social network, a teacher or teaching assistant may have more and/or different priorities and/or rights than students. Further, the active level controller 113 can be used to determine rights of users to access an area or object in the collaborative environment. When a user is modifying an object or area, the active level controller 113 can store an instance of the original area or object and the modified area or object. As the user is modifying the object or the area, the active level controller 113 can be used to store information indicating that the user is actively modifying the area. Moreover, when the user has completed the user's modification, the user can submit the modification and an identifier of the user can be associated with the area. The submission can be stored in a memory 211 associated with the collaborative services platform 103.

Additionally, when the user has completed modifying the object or the area, the activity level controller 113 can be used to assign or modify an activity level rating of the user. In one example, the activity level rating of a user can be an integer that can be incremented by a value based on each modification the user makes. In another example, the activity level of a user can be a floating value that can be incremented by one or more values based on modifications or other activity performed by the user and can diminish over time. For example, the activity level rating can decay based on a logarithmic algorithm over time. The activity level rating may also be updated and stored in the social network controller 111, which can use the activity level rating to determine priority rights of users.

A priority right of a user can be assigned based on a social role rating and an activity level rating. The social role rating may be a static or a dynamic value based on the role of a user in a collaborative environment. The user may have multiple social roles in a single collaborative environment because the collaborative environment may be split into separate areas, slides, or other partitions that can each have different social roles. For example, one user may be designated to be a supervisor over a first area and a regular user in a second area because the user has experience in the first area. In one embodiment, experiences or interests of a user can be accessed in a profile of the user in a social network service 109 and be used to determine when it is appropriate for the user to have a supervisory role because the user has a special interest or experience in the first area. For example, if the user is an expert on dogs or has a dog and the first area is associated with a dog, the user may be assigned a supervisory role over the first area. The profile of the user can be parsed to determine a weight on the role of the user based on e.g., the number of times a word (e.g., dog) appears on the user's profile.

When resolving collisions and/or collaboration synchronizations, the priority on which user's modifications have priority can be determined based on the social role rating and/or the activity level rating of the user. In one embodiment, the social role rating and the activity level rating can be added together to create a priority rating. In this embodiment, the highest priority rating is selected for conflicts to be resolved in favor of In another embodiment, the ratings can be used in voting for a resolution. The ratings can be set as weights on each user's vote. A vote can be successful if the vote receives a threshold weighted count. The threshold can be preset or can be dynamic based on the number of users currently active in the collaborative environment. Votes can be yes or no votes (e.g., to approve or deny a change) or can be a selection vote (e.g., to select which modification of multiple users on an area to select and use). A vote can be used by the collaborative services platform 103 for certain changes by a user that can be approved by a vote. In yet another embodiment, the priority rating is based on the social role rating (e.g., when the social role designates a manager).

In one embodiment, the cross-layer collaborative protocol 300 includes a representation layer 305. The representation layer 305 can be used to render views of a collaborative environment. The collaborative services platform 103 can send users a synchronization message over the communication layer 301. The message can be processed to determine a visualization rendering update. The UE 101 of the user can then display the rendered visualization. This visualization can be an active visualization of activities occurring in the collaborative environment or can be a visualization of a complete or partially complete presentation.

Additionally, each object in a collaborative environment can have a data structure associated with the object. The data structure can include an identifier of the object, attributes for the object, coordinates for the object, and an identifier of users that contributed to the object. When a user creates or modifies an object, a message associated with the object can be sent to the collaborative services platform 103 and then to other users via the communication layer 301. The object identifier can include a type of object or object tool that was used to create the object (e.g., a pen identifier, an elephant identifier, a dog identifier, etc.). The attribute data can include attributes that can be associated with a particular identifier (e.g., the pen identifier can be associated with a color of the pen and a thickness of the pen, the dog identifier can be associated with a movement of the dog during the presentation, etc.). Moreover, the coordinate data can include the coordinates that the identifier is located during the presentation or coordinates that the identifier moves through during the presentation.

Additionally or alternatively, the representation layer 305 may be used to personalize a rendering to view contributions from one or more users. As stated above, when a user makes a contribution to an object or an area, the user can be associated with that object or identifier. One or more users can be associated with the object or area during each step or layer of a presentation. The user may optionally view all of the contributions of one or more users during a presentation.

Figure 4:
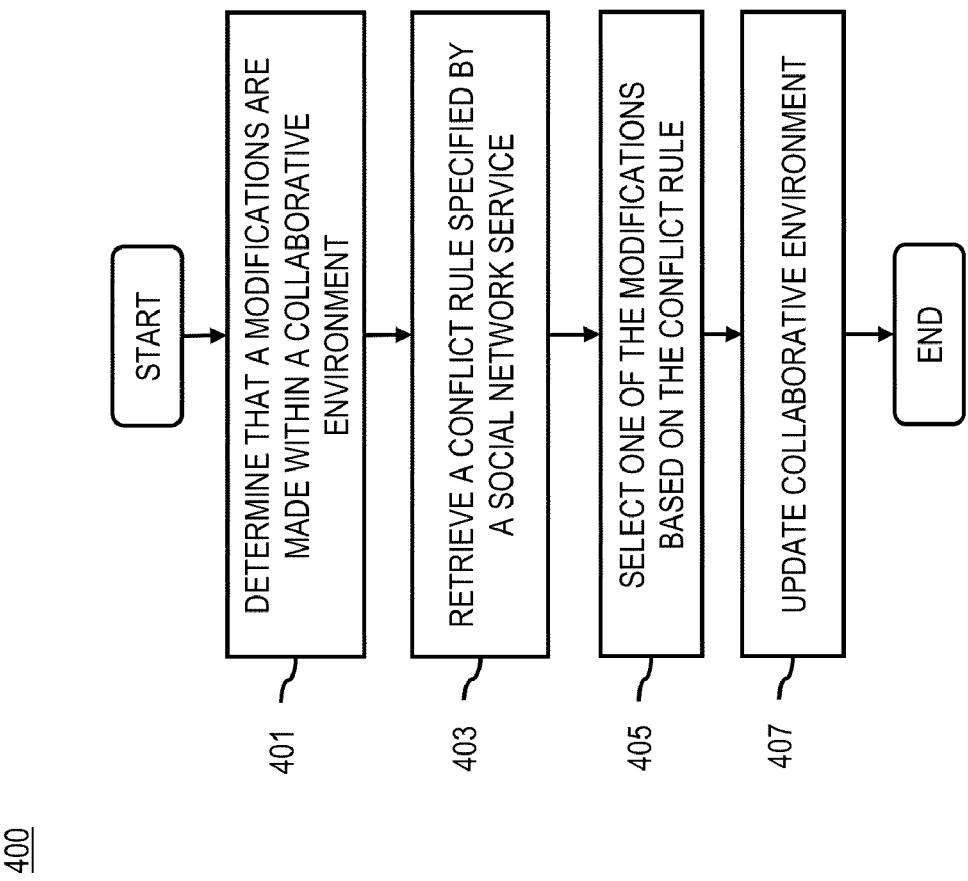
FIG. 4 is a flowchart of a process for modifying an area in a collaborative environment, according to one embodiment.

FIG. 4 is a flowchart of a process for modifying an area in a collaborative environment, according to one embodiment. In one embodiment, the runtime module 203 performs the process 400 and is implemented in, for instance, a chip set including a processor and a memory as shown FIG. 8. The collaborative services platform 103 can deploy a collaborative environment in response to a request by a UE 101. The collaborative environment can be stored in a memory 211 associated with the collaborative services platform 103. In one embodiment, the collaborative environment can include one or more images that can be combined to create an animation. Additionally, users can be assigned to the collaborative environment with social role and activity level ratings. The users can be identified by the UE 101 that requested the deployment of the collaborative environment. These users may also be members of a social network service 109. The social role rating of the users can be based on user profiles as discussed in the discussion of priority rights. Moreover, the activity level ratings may be based on an activity history of the user stored on the collaborative services platform 103, whether associated with the collaborative environment or not associated with the collaborative environment. Further, the collaborative services platform 103 and UEs 101 of the users can communicate via a cross-layer collaborative protocol 300 having a communication layer 301, a cooperation layer 303, and a representation layer 305.

In step 401, the runtime module 203 determines that a plurality of modifications are made within a collaborative environment to an area of an image. The modifications can be initiated by one or more users via a UE 101 of the respective user. Before initiating a modification, the UE 101 asks for permission to modify the area by specifying the area of the modification or a specific object to be modified. Then, the runtime module 203 determines if the user has access to the area based on activity in the area (e.g., based on a process as described in FIG. 5.). If there is no activity in the area, the user is provided modification privileges. If there is current activity in the area, the user is denied modification privileges and the user is provided an alert when the area is available. When the user is granted the modification privilege an instance (e.g., a copy) of the area can be made available to the user to modify. Modifications to the area may be entered into the UE 101 of the user and stored in one or more object data structures. An object data structure can, as stated above, be used as a message to send, by the UE 101, to the collaborative services platform 103 to modify the object. Updates of the modification in the instance can be received at the runtime module 203. The runtime module 203 can then, via the communication interface 201, notify additional users (e.g., via a multicast message of the communication layer 301) of the active modifications of the user in the area. When the user has completed the user's modification, the instance can be submitted to and received by the runtime module 203. The modifications made in the instance may need to be approved by a selection process.

Then, at step 403, the runtime module 203 can retrieve a conflict rule specified by a social network service 109. The conflict rule can be used to select one of the modifications (step 405). The selection can be used to determine which one of the modifications to implement in the collaborative environment. Under one scenario, the conflict rule is based on social role ratings and/or activity level ratings as described in the discussion of the cooperation layer 303. In one embodiment, the conflict rule selects a modification based on the greatest priority rating. The greatest priority rating is the rating with the most priority. The priority rating can be determined based on a calculation of each user's individual social role rating and active level rating. The calculation can be a simple addition, or it can be weighted. In another embodiment, the conflict rule selects a modification based on a weighted vote. The vote can be weighted based on the priority ratings of the users. A vote can be successfully completed when a certain threshold level of votes are met. In an exemplary embodiment, the threshold can dynamically change based on the number of users actively associated with collaborative environment during the vote. Moreover, the conflict rule can include an option that allows the initiators of the modifications to determine the selection by withdrawing the initiator's modification from the selection process. In this manner, the initiator can recommend the anther user's modification for selection.

Then, at step 407, the collaborative environment can be updated. The collaborative environment can be updated by the runtime module 203 to implement the modification selection based on the conflict rule. Next, the runtime module 203 can synchronize UEs 101 associated with users of the collaborative environment via an update using the cooperation layer 303 and communication layer 301 of a cross-layer collaborative protocol 300. The runtime module 203 can also store an identifier marking the selected modification's initiator as a contributor to the area and/or object the initiator work on. Moreover, the runtime module 203 may cause, at least in part, actions leading to the presentation of the collaborative environment to the users that collaborate to create the collaborative environment as well as to one or more users other than the members. These actions can include providing the updated collaborative environment to UEs 101 of the users for presentation of the UE 101. Additionally or alternatively, the users other than the members can share the collaborative environment with more users.

With the above approach users can avoid or resolve collisions in a collaborative environment. The users are provided a presentation that can display areas that are actively being modified to increase transparency to other users and avoid duplicate work. Removing duplication of work effort increases efficiency and can thus reduce energy consumption of the collaborative services platform 103 and UEs 101.

Figure 5:
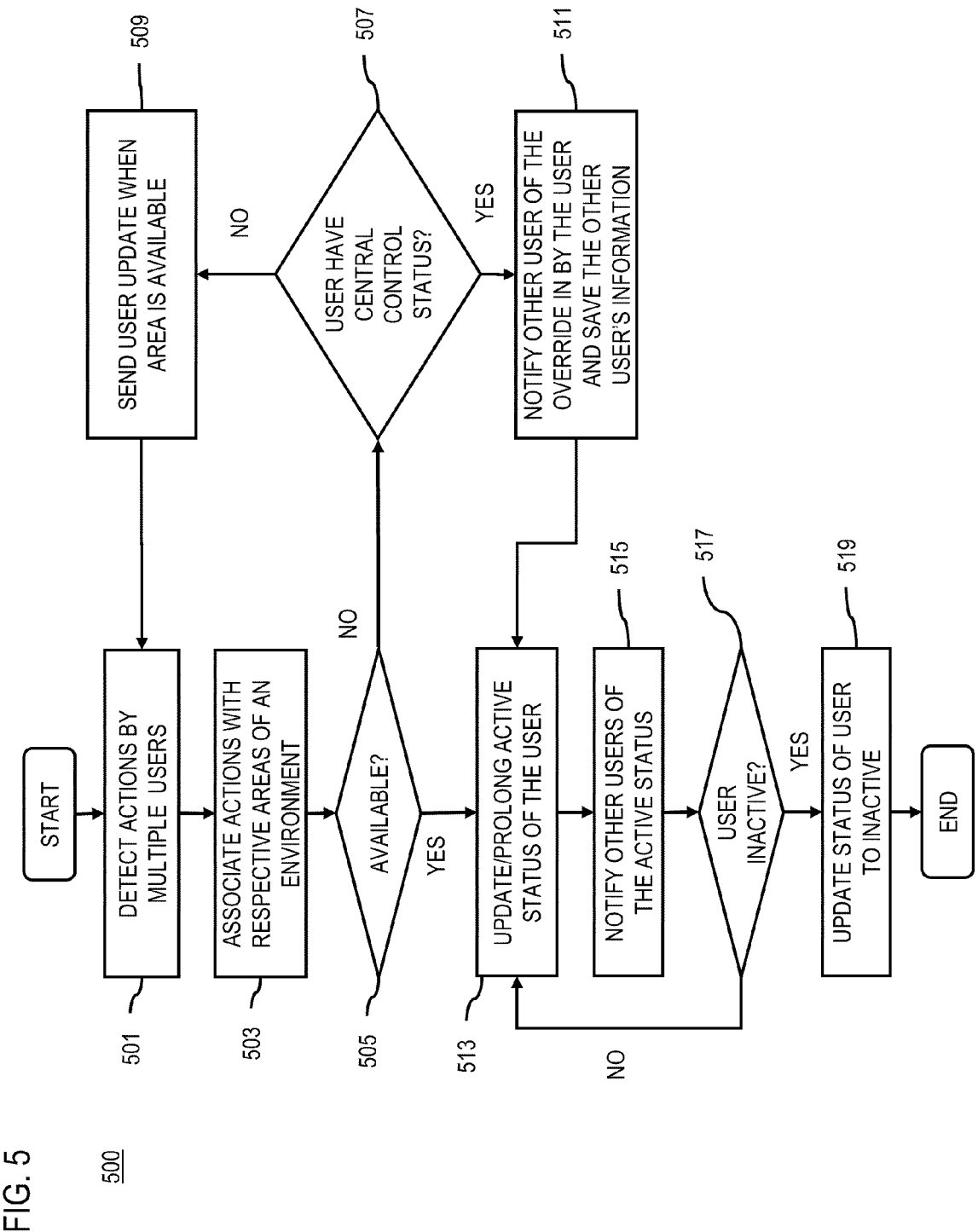
FIG. 5 is a diagram exemplifying collision avoidance and resolution in a collaborative environment, according to one embodiment.

FIG. 5 is a diagram exemplifying collision avoidance and resolution in a collaborative environment, according to one embodiment. In one embodiment, the runtime module 203 performs the process 500 and is implemented in, for instance, a chip set including a processor and a memory 211 as shown FIG. 8. The collaborative services platform 103 can deploy a collaborative environment in a memory of the collaborative services platform 103 based on a request by a UE 101. Moreover, users that may be associated with a social network service 109 can be assigned to the collaborative environment by the UE 101 or be chosen by the runtime module 203. The collaborative environment can include one or more images that can be combined to create an animation. Users can submit a request to modify an area of the collaborative environment.

At step 501, the runtime module 203 detects actions by multiple users. The runtime module 203 monitors the communication interface 201 to determine when one or more requests to modify areas of the collaborative environment occur. Then, at step 503, the one or more requests are respectively associated with areas of the collaborative environment. The requests may contain area information (e.g., a set of coordinate ranges of an image) based on user input. With respect to a particular request to modify an area, the runtime module 203 can determine if the area is available to be modified (step 505). If the area is not available to be modified, then at step 507, the runtime module 203 can determine if the user has central control status. The central control status identifies the user as having special privileges to modify an area even though another user is currently active in the area. The central control status can be a parameter associated with the user in an identifier of the user. If the user does not have central control status, the user is denied privileges to modify the area and is sent an update when the area is available (step 509). If the user does have central control status, the runtime module 203 can notify the other user of the override by the user with central control status. The runtime module 203 may also save the other user's modification information for later use (step 511).

Then, at step 513, if the area is available or the user has central control status, the runtime module 203 can update the status of the user to active in the area. Under one scenario, when the user is active in the area, other users may not be able to access the area until the user becomes inactive. Thus, at step 515 other users are notified of the active status of the user in the area. The runtime module 203 can inform the other users via a multicast message via the communication interface 201. The UEs 101 of the other users can present the information to the user via the representation layer 305 of a cross-layer collaborative protocol 300 in the form of a presentation (e.g., as shown in FIG. 6C). Next, at step 517, the runtime module 203 determines if the user is inactive. A user can be inactive if the runtime module 203 has not detected an action by the user for a threshold amount of time. Additionally, a user can be inactive in the area if the runtime module 203 detects that the user has requested to become active in another area. If the user is active, then the active status of the user is prolonged (step 513). If the user is inactive in the area, at step 519, the status of the user is set to inactive. Once the status of the user is set to inactive, a message can be sent to each of the other UEs 101 that the area is available.

According to the above approach, users of a collaborative environment may modify the collaborative environment while avoiding conflicts. The collaborative environment can be synchronized to present the status of areas of the collaborative environment as well as associations of the users to the areas to devices of the users. The presentation of the status of the areas allows the users to avoid duplication of work efforts by notifying the users of modifications made by other users.

Figure 6A:
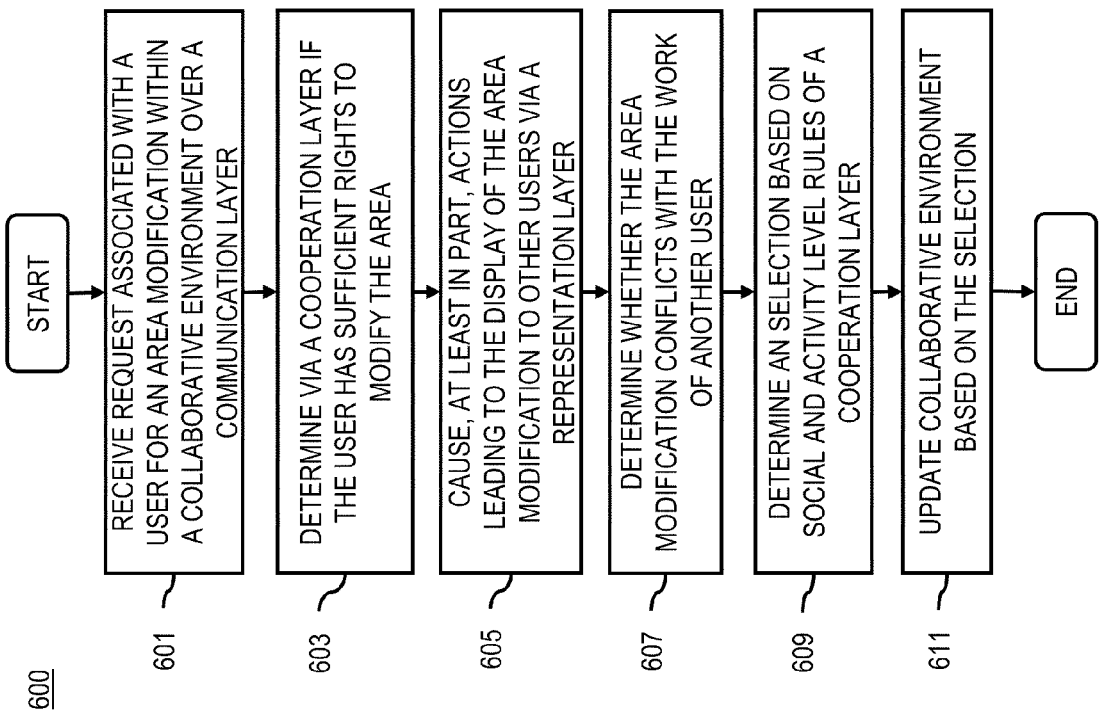
FIG. 6A is a flowchart of a process for utilizing a cross-layer collaborative protocol to provide collaborative graphical activities, according to one embodiment.
Figure 6B:
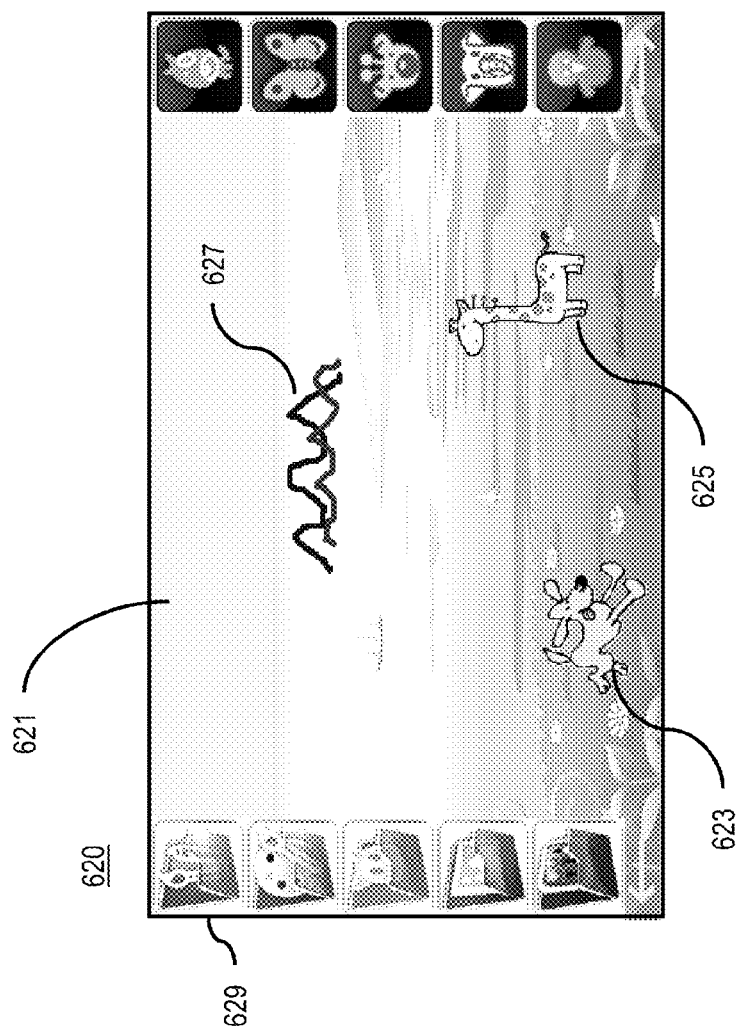
Figure 6C:
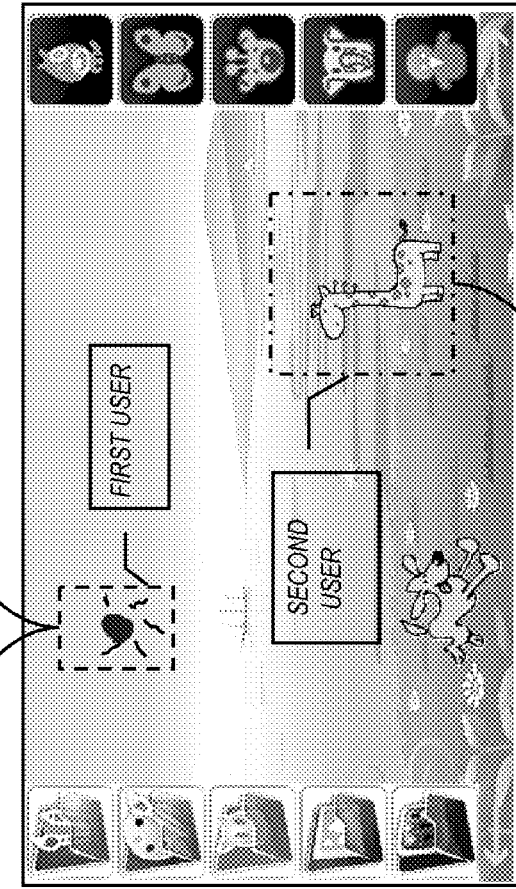
Figure 6D:
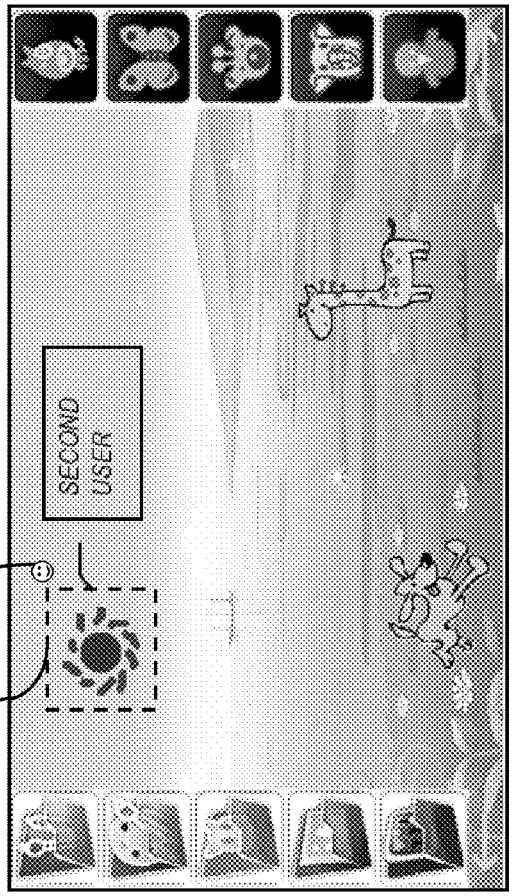

FIG. 6A is a flowchart of a process for utilizing a cross-layer collaborative protocol to provide collaborative graphical activities, according to one embodiment. FIGS. 6B-6F are diagrams of user interfaces utilized in the process of FIG. 6A to illustrate examples of the collaborative graphical activities. In one embodiment, the runtime module 203 performs the process 600 and is implemented in, for instance, a chip set including a processor and a memory as shown FIG. 8. The collaborative services platform 103 may provide a collaborative environment stored in a memory of the collaborative services platform 103. The collaborative environment may be displayed on a user interface 620 and may include a background image 621. Moreover, the user interface may additionally include predetermined objects such as a dog object 623 and a giraffe object 625 as well as tool-created objects such as line objects 627. Tools 629, such as a pen tool, a paint tool, and other artistic tools can be provided to users of the collaborative services platform 103 via the user interface 620 on a UE 101.

At step 601, the runtime module 203 receives a request associated with a first user to modify a first area within the collaborative environment. The request can be sent by a UE 101 of the first user over a communication layer 301 and received by the runtime module 203 via a communication interface 201. The runtime module 203, at step 603 then determines via a cooperation layer 303 if the first user has sufficient rights to modify the first area. The runtime module 203 can make this determination via the process 500 of FIG. 5. If the first user has sufficient rights to modify the first area 631, the first user can be provided the first area 631 as an instance of the current area. Moreover, while the first user is modifying the first area 631, a second user may be modifying a second area 633. The second user is able to view the modifications of the first user because the runtime module 203 is caused, at least in part, to cause actions to the display of the area modification to other users (such as the second user) via a representation layer 305. Thus, the second user can view the actions of the first user on the second user's UE 101. When the first user has completed the first user's actions, the first user can submit the work to the runtime module 203. The runtime module 203 can determine that there are no conflicts with the first area 631 because the first user is the first user to be associated with the area. The runtime module 203 can then associate the first user with the first area 631 and/or an object in the first area 635. The runtime module 203 can store this association in a memory 211 of the collaborative services platform 103.

After viewing the actions of the first user, the second user can determine that the second user wishes to modify the first area 631. The second user can request and receive rights to modify the first area 631 via steps 601, 603, and 605 performed by the runtime module 203. Then, the second user can modify the first area 641. The first user is able to see the modification made by the second user and can add comments 643 to encourage the second user to make more modifications. The comments can be in the form of text, emotional figures, or any other visible communication. In certain embodiments, the comments are limited to the user interface 640 of the second user. Next, the second user can submit the second user's modifications to the runtime module 203.

Then, the runtime module 203 determines, at step 607, that the area modification conflicts with the work of another user, the first user. The runtime module 203 makes this determination by reviewing the prior associations of the first area. During this phase, the user interface 650 of other UEs 101 can display the work product of the first user in the first area 651 while the modifications are in conflict. Next, at step 609, the runtime module 203 determines a selection of which modification, the first user's modification or the second user's modification, to use based on the cooperation layer 303. The selection process can be determined in the same or similar method as step 405 of FIG. 4. Moreover, the first user can resolve the selection conflict by rescinding the first user's modification from the selection process.

Once the conflict is resolved, at step 611, the runtime module 203 can update the collaborative environment based on the selection. The update can include updating the image areas of the collaborative environment on associated UEs 101 via a multicast. Associations of the areas and objects to users can also be updated by the runtime module 203. The associations can be displayed to users of the collaborative environment via a personalized presentation mode of the representation layer 305. User interface 660 displays a presentation of the collaborative environment presenting that the first user and second user are associated with the first area 661 and that the second user is associated with the second area 663.

The processes described herein for providing collaborative graphical creation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
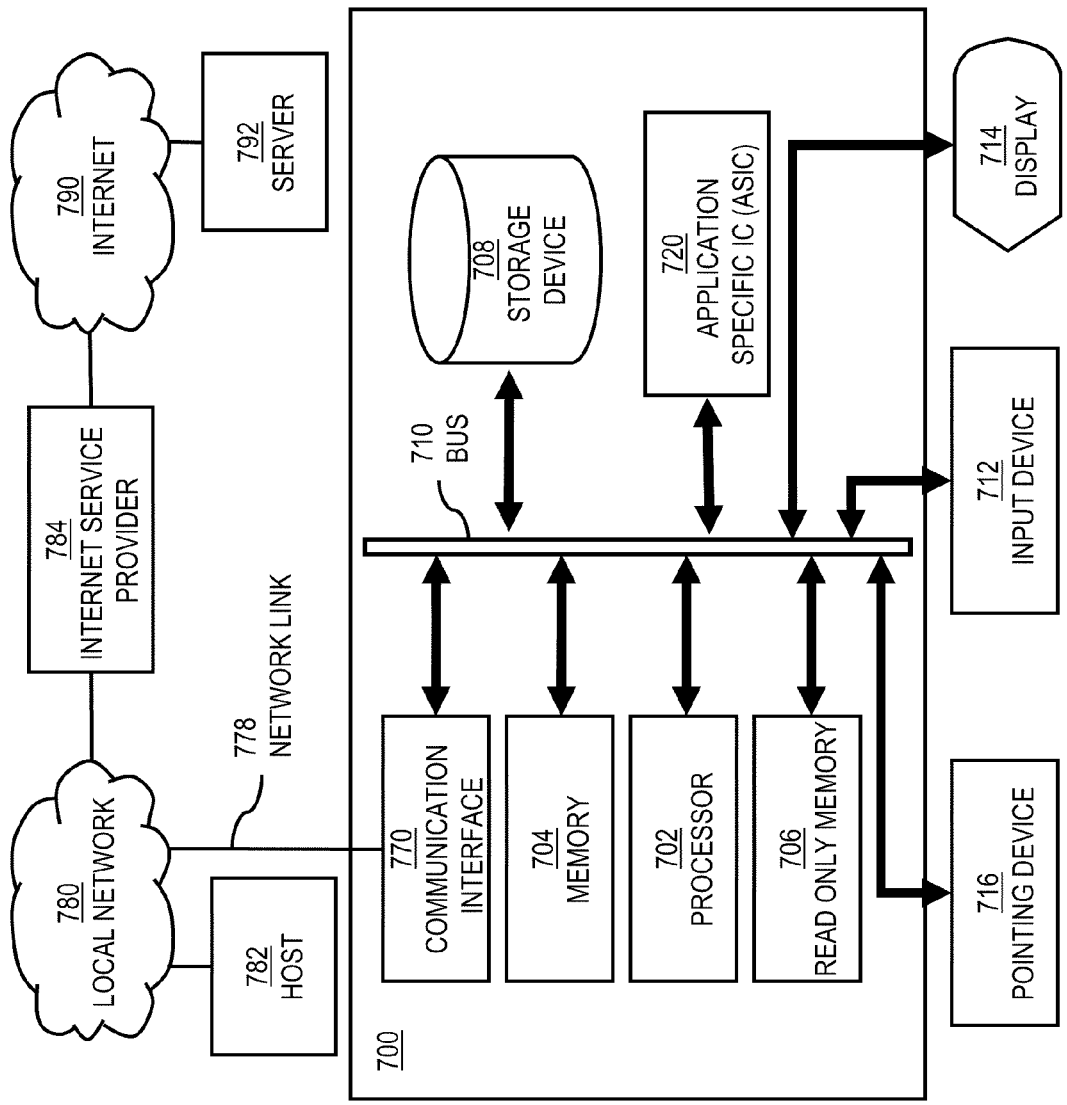
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to perform collaborative graphical creation as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of performing collaborative graphical creation.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to performing collaborative graphical creation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions.

Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for performing collaborative graphical creation. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for performing collaborative graphical creation, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing collaborative graphical creation to the UE 101.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
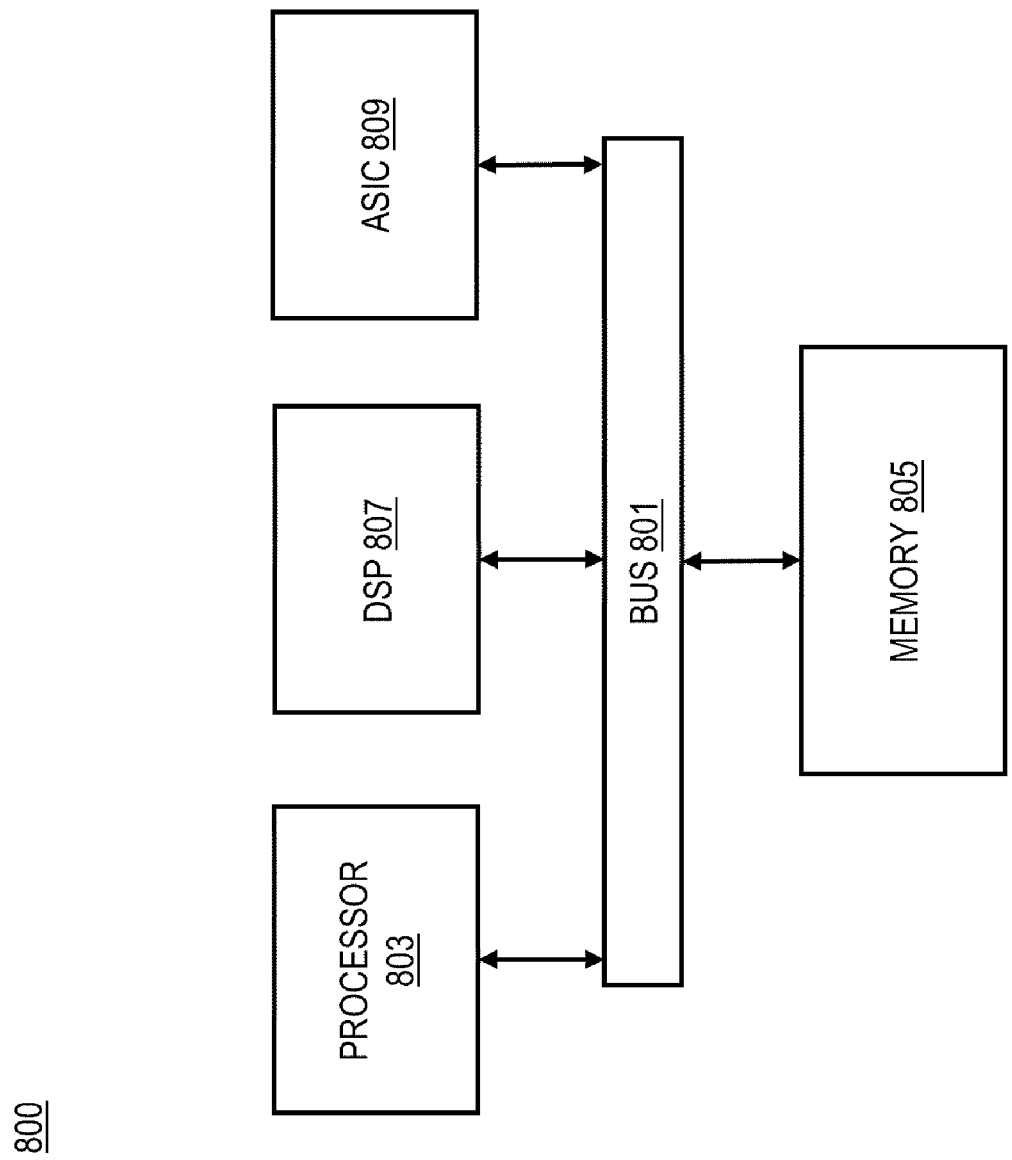
FIG. 8 is a diagram of a chip set that can be used to implement an embodiment of the invention.

FIG. 8 illustrates a chip set 800 upon which an embodiment of the invention may be implemented. Chip set 800 is programmed to perform collaborative graphical creation as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of performing collaborative graphical creation.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide for performing collaborative graphical creation. The memory 805 also stores the data associated with or generated by the execution of the inventive steps.

Figure 9:
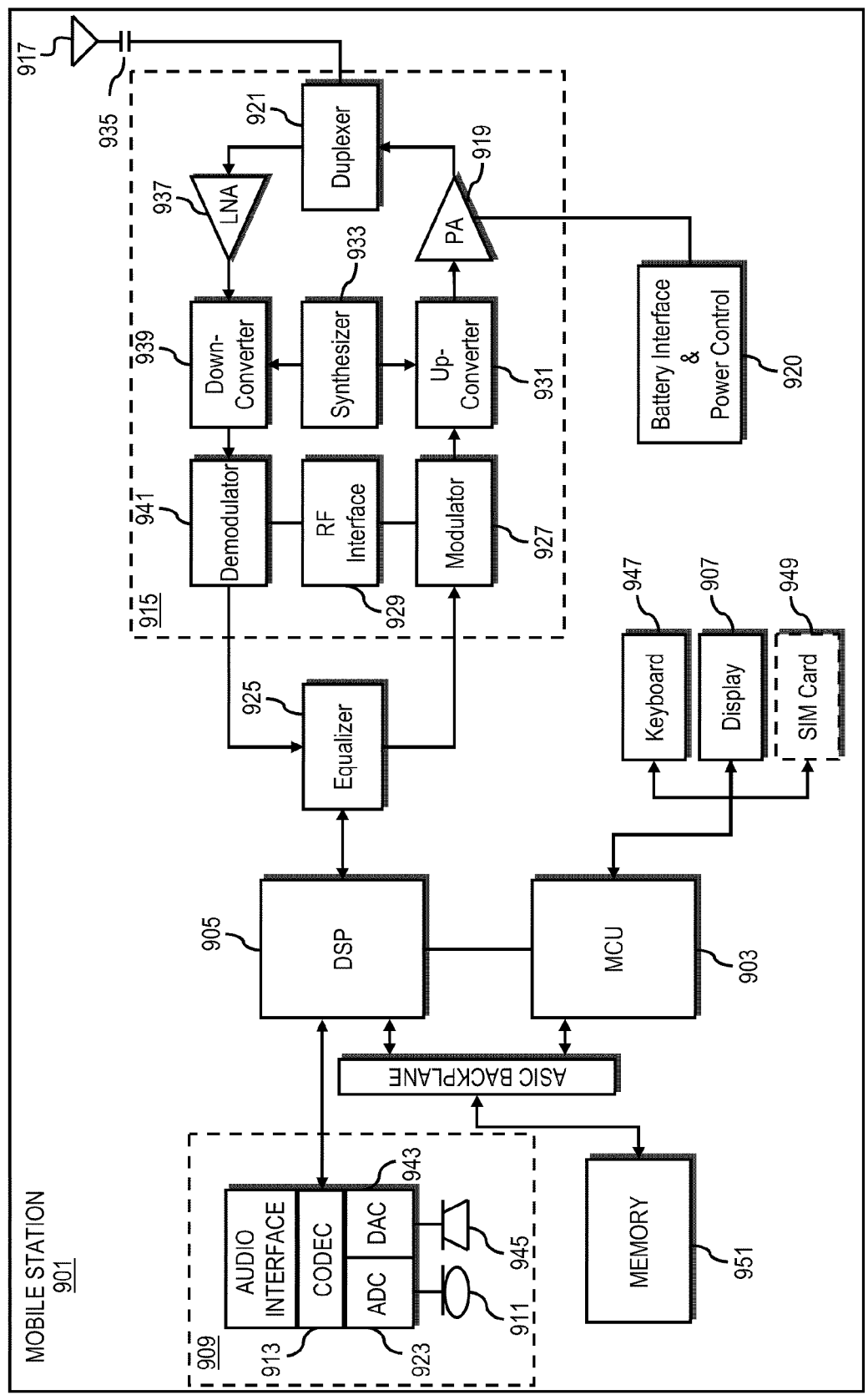
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing or utilizing a collaborative graphical environment. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such, if applicable to the particular context, as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their)

accompanying software/or firmware. The term "circuitry" would also cover, if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing or utilizing a collaborative graphical environment. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide or utilize a collaborative graphical environment. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining that a plurality of modifications are made within a collaborative environment to an area of an image, wherein the modifications are initiated by a plurality of members of a social network service;
   retrieving a conflict rule specified by the social network service;
   selecting one of the modifications based on the conflict rule;
   determining a social role rating of each of the members;
   determining an activity level rating of each of the members; and
   determining a priority rating of each of the members based on the social role rating and the activity level rating, wherein the conflict rule specifies the determined priority rating for use in the selection of the one modification.

2. A method of claim 1, wherein the modifications are made according to a collaborative protocol that comprises,
   a cooperation layer configured to synchronize the collaborative environment among a plurality of devices corresponding to the plurality of members; and
   a communication layer configured to cause, at least in part, transmission of messages to the devices to support the synchronization.

3. A method of claim 2, wherein the collaborative protocol further comprises a representation layer configured to render a representation of the collaborative environment.

4. A method of claim 1, further comprising:
   detecting that one of the plurality of modifications is an active modification;
   associating the area with the initiating member of the one modification as being actively used by the initiating member; and
   causing, at least in part, notifying at least a portion of the plurality of members of an activity performed on the area.

5. A method of claim 1, wherein the conflict rule specifies a threshold vote value for use in the selection of the one modification, the method further comprising:
   requesting a vote input from devices associated with the plurality of members; and
   comparing the vote input with the threshold vote value.

6. A method of claim 1, further comprising:
   causing, at least in part, presentation of the selected modification on devices of a plurality of users that include the members and/or a user other than the members.

7. An apparatus comprising:
   at least one processor; and
   at least one memory including computer program code, the at least one memory and the computer program code configured to, with the at least one processor, cause the apparatus to perform at least the following,
   determine that a plurality of modifications are made within a collaborative environment to an area of an image, wherein the modifications are initiated by a plurality of members of a social network service;
   retrieve a conflict rule specified by the social network service;
   select one of the modifications based on the conflict rule;
   determine a social role rating of each of the members;
   determine an activity level rating of each of the members; and
   determine a priority rating of each of the members based on the social role rating and the activity level rating, wherein the conflict rule specifies the determined priority rating for use in the selection of the one modification.

8. An apparatus of claim 7, wherein the modifications are made according to a collaborative protocol that comprises,
   a cooperation layer configured to synchronize the collaborative environment among a plurality of devices corresponding to the plurality of members; and
   a communication layer configured to cause, at least in part, transmission of messages to the devices to support the synchronization.

9. An apparatus of claim 8, wherein the collaborative protocol further comprises a representation layer configured to render a representation of the collaborative environment.

10. An apparatus of claim 7, wherein the apparatus is further caused, at least in part, to:
    detect that one of the plurality of modifications is an active modification;
    associate the area with the initiating member of the one modification as being actively used by the initiating member; and
    cause, at least in part, notifying at least a portion of the plurality of members of an activity performed on the area.

11. An apparatus of claim 7, wherein the conflict rule specifies a threshold vote value for use in the selection of the one modification, and the apparatus is further caused to perform at least the following,
    request a vote input from devices associated with the plurality of members; and
    compare the vote input with threshold vote value.

12. An apparatus of claim 7, wherein the apparatus is further caused, at least in part, to:
    present the selected modification on devices of a plurality of users that include the members and/or a user other than the members.

13. A computer-readable storage medium carrying one or more sequences of one or more instructions which, when executed by one or more processors, cause an apparatus to at least perform the following steps:
    determining that a plurality of modifications are made within a collaborative environment to an area of an image, wherein the modifications are initiated by a plurality of members of a social network service;
    retrieving a conflict rule specified by the social network service;
    selecting one of the modifications based on the conflict rule;
    determining a social role rating of each of the members;
    determining an activity level rating of each of the members; and
    determining a priority rating of each of the members based on the social role rating and the activity level rating, wherein the conflict rule specifies the determined priority rating for use in the selection of the one modification.

14. A computer-readable storage medium of claim 13, wherein the modifications are made according to a collaborative protocol that comprises,
    a cooperation layer configured to synchronize the collaborative environment among a plurality of devices corresponding to the plurality of members; and
    a communication layer configured to cause, at least in part, transmission of messages to the devices to support the synchronization.

15. A computer-readable storage medium of claim 14, wherein the collaborative protocol further comprises a representation layer configured to render a representation of the collaborative environment.

16. A computer-readable storage medium of claim 13, wherein the apparatus is caused, at least in part, to further perform:
   detecting that one of the plurality of modifications is an active modification;
   associating the area with the initiating member of the one modification as being actively used by the initiating member; and
   causing, at least in part, notifying at least a portion of the plurality of members of an activity performed on the area.

17. A computer-readable storage medium of claim 13, wherein the conflict rule specifies a threshold vote value for use in the selection of the one modification, and the apparatus is further caused to perform at least the following,
   requesting a vote input from devices associated with the plurality of members; and
   comparing the vote input with the threshold vote value.

* * * * *